United States Patent [19]

Okubo

[11] Patent Number: 5,105,359

[45] Date of Patent: Apr. 14, 1992

[54] ANTI-LOCK CONTROL SYSTEM FOR MOTOR VEHICLE

[75] Inventor: Satomi Okubo, Kuki, Japan

[73] Assignee: Akebono Brake Industry Co., Ltd., Tokyo, Japan

[21] Appl. No.: 532,931

[22] Filed: Jun. 4, 1990

[30] Foreign Application Priority Data

Jun. 14, 1989 [JP] Japan ............................. 1-149454

[51] Int. Cl.⁵ .............................................. B60T 8/34
[52] U.S. Cl. ............................... 364/426.02; 303/100; 303/103
[58] Field of Search ..................... 364/426.01–426.03; 180/197; 303/95, 97, 100, 105

[56] References Cited

U.S. PATENT DOCUMENTS

| | | | |
|---|---|---|---|
| 4,672,547 | 6/1987 | Masaki et al. | 364/426.02 |
| 4,859,002 | 8/1989 | Yoshino | 303/103 |
| 4,883,326 | 11/1989 | Sugitani et al. | 303/110 |
| 4,930,083 | 5/1990 | Hoashi et al. | 364/426.02 |
| 4,984,163 | 1/1991 | Kuwana et al. | 364/426.02 |
| 4,985,839 | 1/1991 | Dominke | 364/426.02 |
| 4,991,910 | 2/1991 | Shimanuki et al. | 303/109 |

Primary Examiner—Thomas G. Black

[57] ABSTRACT

An anti-lock control system is disclosed which includes rough-road judging means for judging whether the vehicle is running on a rough road or not; and decay timer means for limiting time period during which reduction of the brake hydraulic pressure is occurring. The decay timer means is arranged, when the vehicle is running on a normal road, to limit the time period of brake hydraulic pressure reduction within a first peredetermined time length, the decay timer means being also arranged to limit the time period of brake hydraulic pressure reduction within a second predetermined time length shorter than the first predetermined time length.

6 Claims, 6 Drawing Sheets

ANTI-LOCK CONTROL SYSTEM FOR MOTOR VEHICLE

BACKGROUND OF THE INVENTION

1. Field of the Invention

This invention relates to a novel and improved anti-lock control system for motor vehicles, which is operative to prevent the wheels of the motor vehicle from being locked during braking operation of the motor vehicle.

2. Description of the Prior Art

Generally, with an anti-lock system for motor vehicles, anti-lock control is effected by means of microcomputers such that hold valves and decay valves comprising electromagnetic valves are opened and closed on the basis of electrical signals representing wheel speeds sensed by wheel speed sensors, thereby increasing, holding or reducing the brake hydraulic pressure, for the purpose of securing improved steering performance and running stability of the motor vehicle, while at the same time shortening the braking distance.

FIG. 1 of the accompanying drawings illustrate, by way of example, manners in which wheel speed Vw, wheel acceleration and deceleration dVw/dt and brake hydraulic pressure Pw are varied during the operation of the conventional anti-lock control system, together with hold signal HS and decay signal DS for opening and closing hold valves and decay valves, as disclosed in U.S. Pat. No. 4,741,580.

When the brake equipment of the motor vehicle is not being operated while the motor vehicle is running, the hold valves remain open while the decay valves remain closed, the brake hydraulic pressure Pw is not increased; and when the brake equipment is operated, the brake hydraulic pressure Pw is rapidly increased at time t0 so that the wheel speed Vw is decreased (normal mode). A reference wheel speed Vr is set up which is lower by a predetermined amount $\Delta V$ than the wheel speed Vw and follows the latter with such a speed difference. More specifically, reference wheel speed Vr is set up so that when the deceleration (negative acceleration) dVw/dt of the wheel reaches a predetermined threshold level, say $-1.1$ G at time t1, anti-lock control is started, and the reference wheel speed Vr is thereafter made to linearly decrease with a deceleration gradient $\theta$ ($=-1.1$ G). At time t2 when the deceleration dVw/dt of the wheel reaches a predetermined maximum value $-Gmax$, the hold signal HS is generated so that the hold valves are closed, thus holding the brake hydraulic pressure Pw.

With the brake hydraulic pressure Pw being held, the wheel speed Vw is further decreased. At time t3, the wheel speed Vw and the reference wheel speed Vr become equal to each other, and a first cycle of anti-lock control is started; and the decay signal DS is generated, by which the decay valves are opened so that reduction of the brake hydraulic pressure Pw is started. As a result of this reduction of the brake hydraulic pressure Pw, the wheel speed Vw is changed from increase to decrease at time t4 when a low peak VL of the wheel speed Vw occurs. The decay signal DS is interrupted either at the time t4 or at time t5 that is a time point when the wheel speed Vw is increased up to the level of a speed Vb that is higher than the low peak speed VL by 15% of the difference Y between wheel speed Va occurring at the time t3 when the reduction of the brake hydraulic pressure was started and the low peak speed VL, i.e., Vb=VL+0.15Y (FIG. 1 shows the case where the decay signal DS is interrupted at the time t4). Thus, the decay valves are closed so that the reduction of the brake hydraulic pressure Pw is stopped and thus the brake hydraulic pressure is held. The wheel speed Vw is further increased up to the level of a speed Vc that is higher than the low peak speed VL by 80% of the difference Y between the wheel speed Va occurring at the time t3 when the reduction of the brake hydraulic pressure Pw was started and the low peak speed VL, i.e., Vc=VL+0.8Y.

Subsequently, at time t7, a high peak VH of the wheel speed Vw is reached; thereupon the brake hydraulic pressure Pw is again increased. Practically, the high peak VH of the wheel speed Vw is detected in the following manner: The highest one of the four wheel speeds of the vehicle is selected ("select high"); a speed having the acceleration/deceleration of the highest wheel speed limited in the range of $\pm 1$ G is computed as computed vehicle speed Vv; and when the wheel speed Vw reaches a value $Vv - \Delta V_o$ that is lower than the computed vehicle speed by a predetermined amount $\Delta V_o$ before a high peak of the wheel speed Vw is actually reached, it is judged that the high peak VH of the wheel speed Vw is reached, whereupon buildup of the brake hydraulic pressure is started. In this case, the buildup of the brake hydraulic pressure Pw is effected in such a manner that the brake hydraulic pressure Pw is alternately increased and held in succession by the fact that the hold signal HS is turned on and off mincingly, or with relatively short intervals so that the brake hydraulic pressure Pw is caused to gradually build up. In this way, the wheel speed Vw is decreased, and at time t8 (corresponding to the time t3, a second cycle of the mode for reduction of the brake hydraulic pressure occurs. An initial brake hydraulic pressure buildup occurs at time t7; the time period Tx of the initial brake hydraulic pressure buildup is determined on the basis of calculation of the average acceleration (Vc $-$Vb)/$\Delta V$ over the time interval $\Delta T$ between the time t5 and the time t6 (the average acceleration depends on the friction coefficient $\mu$ of the road surface); and the time period of the subsequent pressure holding or pressure buildup is determined on the basis of the acceleration or deceleration of th wheel which is detected immediately prior to the pressure holding or pressure buildup. The brake hydraulic pressure increasing, holding and reducing modes are effected in combination as mentioned above; thus, the wheel speed Vw can be controlled so that the vehicle speed can be decreased, while the wheels of the motor vehicle are prevented from being locked.

When the motor vehicle is running on a rough road, it frequently happens that the wheels thereof are caused to float in the air. In such a state, if the brake equipment of the vehicle is being operated, wheels floating in the air will be rapidly decelerated; and when caused to land on the road again, those wheels start rotation again so that changes in the wheel speeds turn out to be different from those which occur when the vehicle is running on a normal road. More specifically, when the vehicle is running on a rough road, the cycle of the anti-lock control turns out to be faster than when the vehicle is running on a normal road, and the amplitude of the wheel speed Vw also becomes greater.

The conventional anti-lock control system is disadvantageous in that in case slow or quick braking is applied when the motor vehicle is running on a rough road, reduction of brake hydraulic pressure will be frequently started due to changes in the wheel speeds so that the brake hydraulic pressure will be prevented from building up, as a result of which the braking distance will be increased.

SUMMARY OF THE INVENTION

Accordingly, it is an object of the present invention to provide an anti-lock system for motor vehicles, which is so designed that when the motor vehicle is running on a rough road, reduction of the brake hydraulic pressure is prevented from being started early by detecting that the motor vehicle is running on the rough road.

Briefly stated, the anti-lock control system according to this invention includes rough-road judging means for judging whether the vehicle is running on a rough road or not; and decay timer means for limiting time period during which reduction of the brake hydraulic pressure is occurring. The decay timer means is arranged, when the vehicle is running on a normal road, to limit the time period of brake hydraulic pressure reduction within a first predetermined time length, the decay timer means being also arranged to limit the time period of brake hydraulic pressure reduction within a second predetermined time length shorter than the first predetermined time length.

Further, the aforementioned rough road judging means may comprise means measuring control cycle period $\Delta T$ of anti-lock control; and means for comparing the measured cycle period $\Delta T$ with a predetermined time period T and for providing, when the cycle period $\Delta T$ falls within the predetermined time period T, rough-road judgment signal which in turn is applied to control the decay timer means so that time period set on the decay timer is shortened, i.e., changed from the first time length to the second time length.

According to the present invention, when a motor vehicle is running on a rough road which is highly irregular, the time period set on the decay timer for determining the maximum length of the brake hydraulic pressure reduction period is shortened and thus the amount of brake hydraulic pressure is limited so that occurrence of such a state that the brake hydraulic pressure becomes short because of brake hydraulic pressure reduction being frequently started due to abrupt changes in the wheel speed Vw, can be avoided and consequently a satisfactory braking force can be secured.

Other objects, features and advantages of the present invention will become apparent from the ensuing description taken in conjunction with the accompanying drawings.

DESCRIPTION OF THE PREFERRED EMBODIMENTS

The preferred embodiments of the present invention will now be described in detail with reference to the accompanying drawings.

Figure 1:
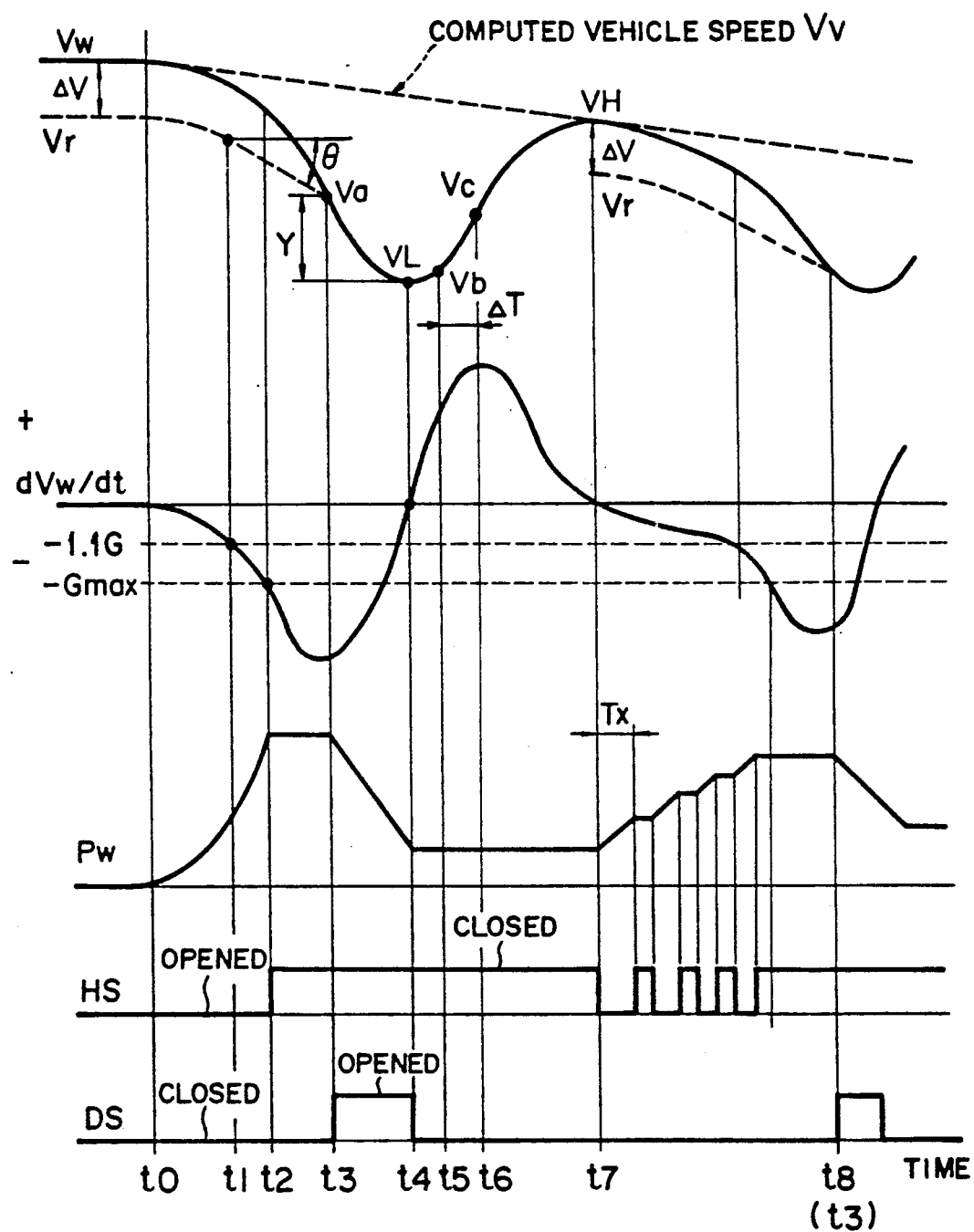
FIG. 1 is a view useful for explaining how anti-lock control is effected with the prior-art anti-lock control system for motor vehicles.
Figure 2:
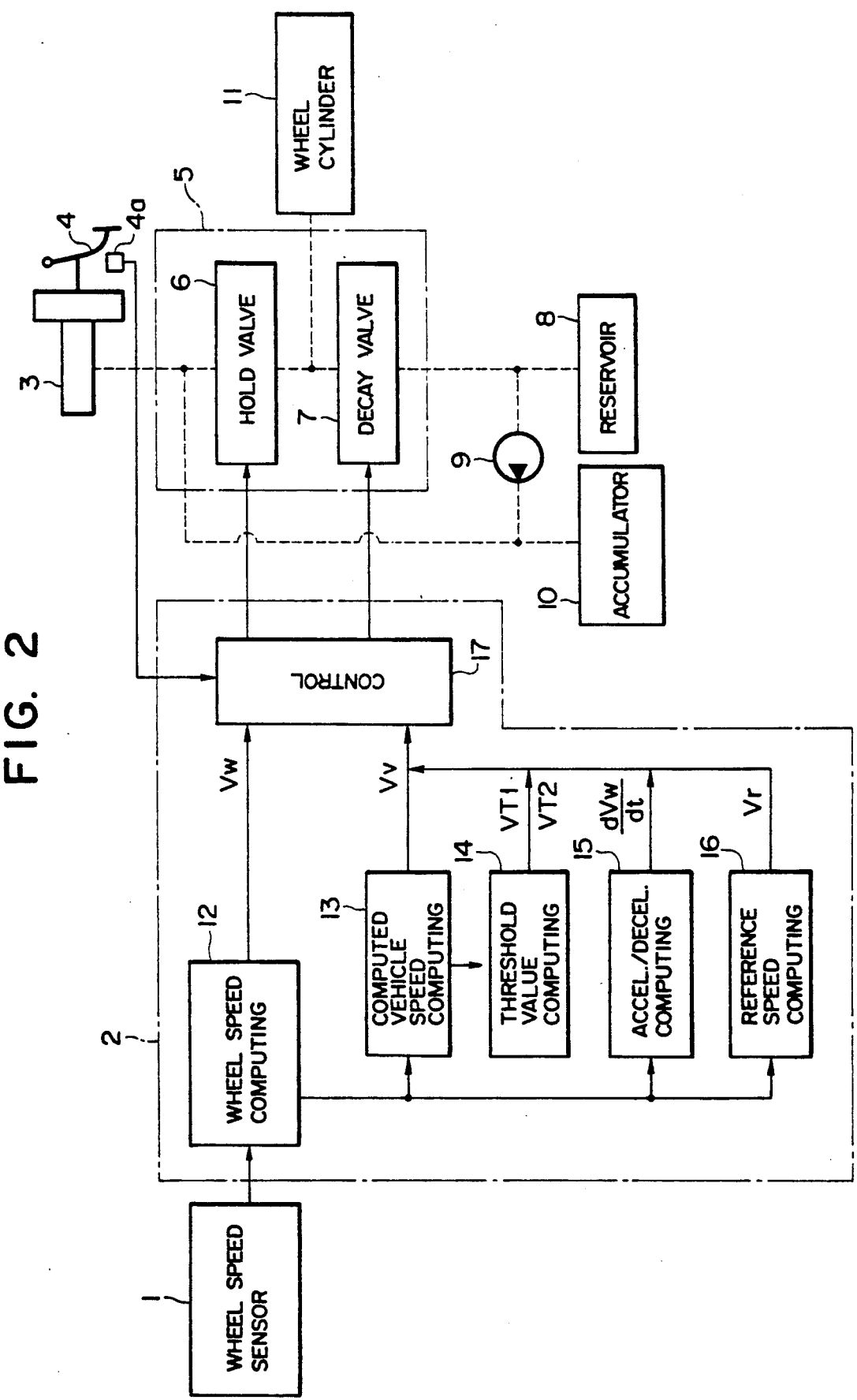
FIG. 2 is a block diagram showing the anti-lock control system according to an embodiment of the present invention.

FIG. 2 is a block diagram of the anti-lock control system according to an embodiment of the present invention.

Signals derived from wheel speed sensors 1 associated with four wheels of the motor vehicle respectively are passed to a control unit 2 comprising microcomputers. Modulator 5 is provided between a master cylinder 3 actuated in response to depression of a brake pedal 4 and a wheel cylinder 11 associated with a respective wheel. The modulator 5 comprises a hold valve 6 which may be a normally open electromagnetic valve, and a decay valve 7 which may be a normally closed electromagnetic valve. Brake liquid which is pumped up from a reservoir 8 by means of a pump 9 is stored in an accumulator 10. Brake switch 4a is turned on in response to the brake pedal 4 being depressed.

The aforementioned control unit 2 comprises speed computing means 12, computed vehicle speed computing means 13, and threshold value computing means 14. The speed computing means 12 is adapted to compute a respective wheel speed Vw from output of a respective one of the wheel speed sensors 1. The computed vehicle speed computing means 13 is arranged to select the highest one of the four wheel speeds and compute the computed vehicle speed by limiting the acceleration and deceleration of the selected highest wheel speed within a range of $\pm 1$ G. The threshold value computing means 14 is arranged to a first threshold speed VT1 and a second threshold speed VT2 each of which follows the computed vehicle speed Vv with a predetermined speed difference (where Vv>VT1>VT2).

The control unit 2 further comprises acceleration/deceleration computing means 15 for computing the acceleration and deceleration dVw/dt of the wheel speed Vw; reference speed computing means 16; and control means 17. The reference speed computing means 16 is arranged to computing reference speed Vr in such a manner that when the deceleration (negative acceleration) dVw/dt of the wheel speed Vw reaches a predetermined threshold level, say $-1.1$ G, the reference speed Vr is caused to linearly decrease with a deceleration gradient $-1.1$ G from a speed ($=Vw-\Delta V$) equal to the current wheel speed Vw minus a predetermined amount $\Delta V$. The control means 17 is arranged to on-off control the hold valve 6 and decay valve 7 incorporated in the modulator 5 on the basis of the outputs of the means 12 to 16, thereby effecting buildup, holding and reduction of the brake hydraulic pressure in the wheel cylinder 11.

[STATUS 0]

This status occurs from a time point A when the brake switch 4a is turned on in response to the brake pedal 4 being depressed to a time point B when the deceleration dVw/dt of the wheel speed Vw reaches a predetermined value, say $-1.1$ G and the reference speed Vr beings to linearly decrease. At this status, the hold valve 6 remains opened ("OFF" state), while the decay valve 7 remains closed ("OFF" state) so that the brake hydraulic pressure in the wheel cylinder 11 is increased because of the brake fluid being fed from the master cylinder 3.

[STATUS 1]

This status occurs from the time point B when the reference speed Vr begins to linearly decrease to a time point C when it is judged that the deceleration of the wheel speed Vw has reached a predetermined value −Gmax. At this status, the hold valve 6 and decay valve 7 are held in "OFF" state as at the status 0.

[STATUS 2 (Pressure holding)]

Figure 3:
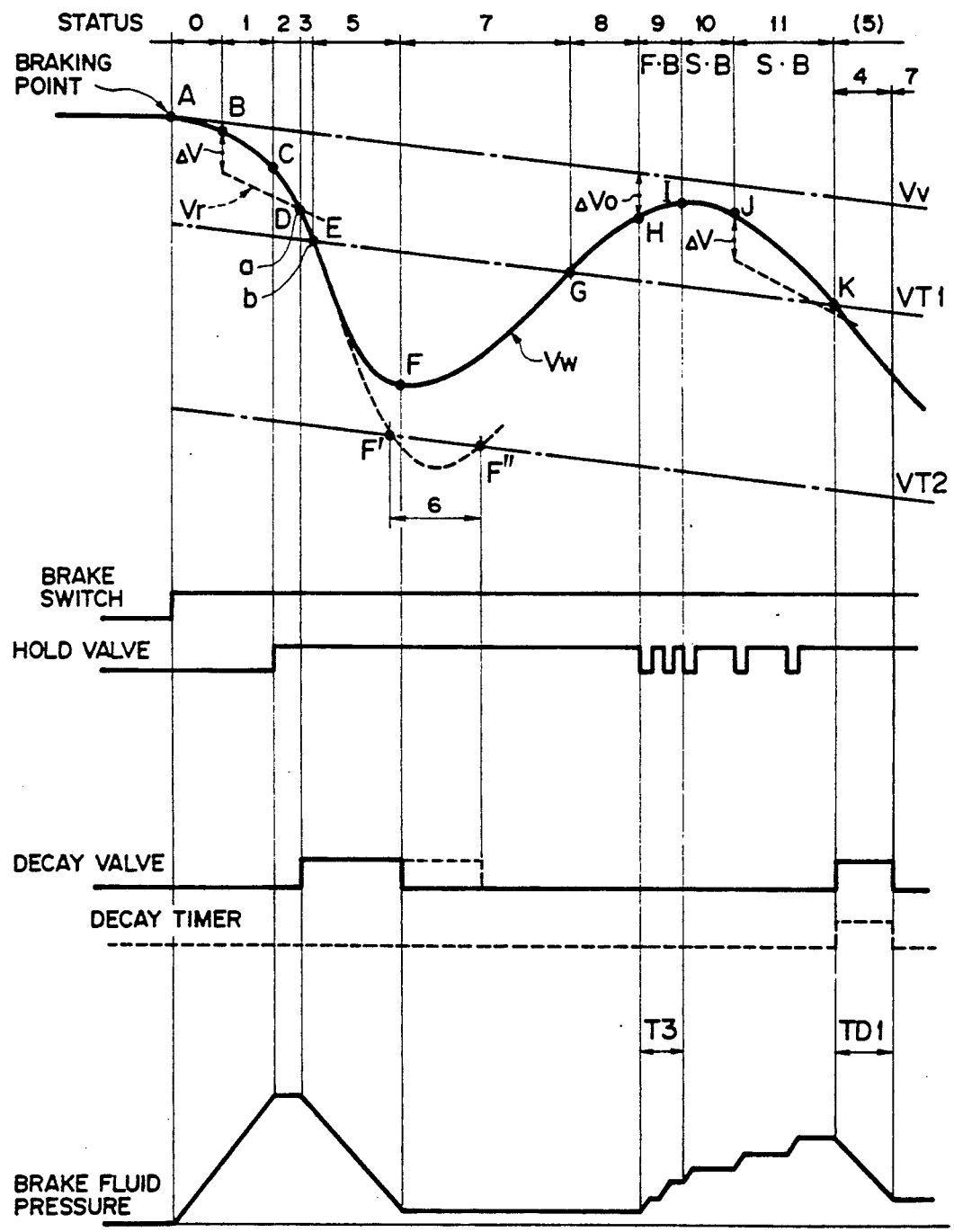
FIG. 3 is a view useful for explaining the operation of the anti-lock control system shown in FIG. 2.

This status occurs for the period from the time point C when it is judged that −Gmax has been reached to earlier one of two time points, i.e., a time point when the wheel speed Vw becomes lower than the reference speed Vr (pressure reduction point a) and a time point when the wheel speed Vw becomes lower than the first threshold value VT1 (pressure reduction point b). At the time point C, the hold valve 6 is closed so that the brake hydraulic pressure is held. In FIG. 3, the status 2 is terminated at a time point D when the wheel speed Vw becomes lower than the reference speed Vr. If, however, the wheel speed Vw becomes lower than the first threshold value VT1 at a time point earlier than the time point D, then the status 2 will be terminated at that time point.

[STATUS 3 (Pressure reduction)]

This status occurs during the period from the time point D when the wheel speed Vw becomes lower than the reference speed Vr to a time point E when the wheel speed Vw becomes lower than the first threshold value VT1. At the time point D, the decay valve 7 is opened so that reduction of the brake hydraulic pressure is started.

[STATUS 4 (Pressure reduction)]

At this status, it is presupposed that the deceleration VvG of the computed vehicle speed Vv is equal to or lower than −0.22 G at the second and succeeding control cycles. This status occurs during the period from a time point when the wheel speed Vw becomes lower than the first threshold value VT1 to a time point when one of the following conditions is satisfied:

(1) The time set on the decay timer terminates. Such time starts when the reduction of the brake hydraulic pressure is started and determines the maximum pressure reduction period.

(2) The wheel speed Vw becomes lower than the second threshold value VT2; and (3) It is judged that a low peak of the wheel speed is reached.

[STATUS 5 (Pressure reduction)]

At this status, it is presupposed either that the control operation is at the first cycle or that the deceleration VvG of the computed vehicle speed Vv is greater than −0.22 G. This status occurs during the period from the time point E when the wheel speed Vw becomes lower than the first threshold value VT1 to earlier one of two time points, i.e., a time point F when it is judged that a low peak of the wheel speed Vw is reached and a time point F' when the wheel speed Vw becomes lower than the second threshold value VT2 as indicated by a broken line in FIG. 3.

[STATUS 6 (Pressure reduction)]

This status occurs during the period from a time point when the wheel speed Vw becomes lower than the second threshold value VT2, i.e., time point F' to a time point F''.

[STATUS 7 (Pressure holding)]

Status 7 occurs when one of the following conditions is satisfied:

(1) A low peak of the wheel speed is detected at the status 4 and 5;

(2) The time set on the decay timer is terminated at the status 4; and (3) The wheel speed Vw becomes higher than the second threshold value VT2 at the status 6 (time point F'').

The status 7 persists for the period from a time point when one of the above conditions is satisfied to the time point C when the wheel speed Vw becomes higher than the first threshold value VT1.

Even when predetermined time period T1 has elapsed at the status 7, in case the wheel speed Vw does not become higher than the first threshold value VT1, the process will be brought to the status 4, so that reduction of the brake hydraulic pressure will be effected again.

[STATUS 8 (Pressure holding)]

The status occurs during the period from the time point G when the wheel speed Vw becomes higher than the first threshold value VT1 to a time point H when the wheel speed Vw reaches a level $(Vv - \Delta V_o)$, i.e., a speed equal to the computed vehicle speed Vv minus a predetermined value $\Delta V_o$.

Even when predetermined time period T2 has elapsed at the status 8, in case the wheel speed Vw does not become higher than the level $(Vv - \Delta V_o)$, then the process will be brought to status 11 so that slow buildup of the brake hydraulic pressure will be effected as mentioned below.

[STATUS 9 (Fast pressure buildup)]

This status occurs during the period from time point H when the wheel speed Vw becomes higher than the speed $(Vv - \Delta V_o)$ to a time point I when predetermined time T3 elapses from the time point H. At this status 9, the hold valve 6 is turned on and off mincingly or with relatively short intervals so that the brake hydraulic pressure is caused to build up gradually.

[STATUS 11 (Slow pressure buildup)]

This status occurs during the time period from a time point J when the reference speed Vr begins to linearly decrease to one of two time points, i.e., a time point when the wheel speed Vw becomes lower than the reference speed Vr and a time point when the wheel speed Vw becomes lower than the first threshold value VT1. More specifically, in FIG. 3, the status 11 is interrupted at the time point K when the wheel speed Vw becomes lower than the first threshold value VT1; however, if the wheel speed Vw becomes lower than the reference speed Vr at a time point prior to the time point K, then the status 11 will be interrupted at that time point. Upon interruption of the status 11, the status 4 or 5 will occur.

Figure 4:
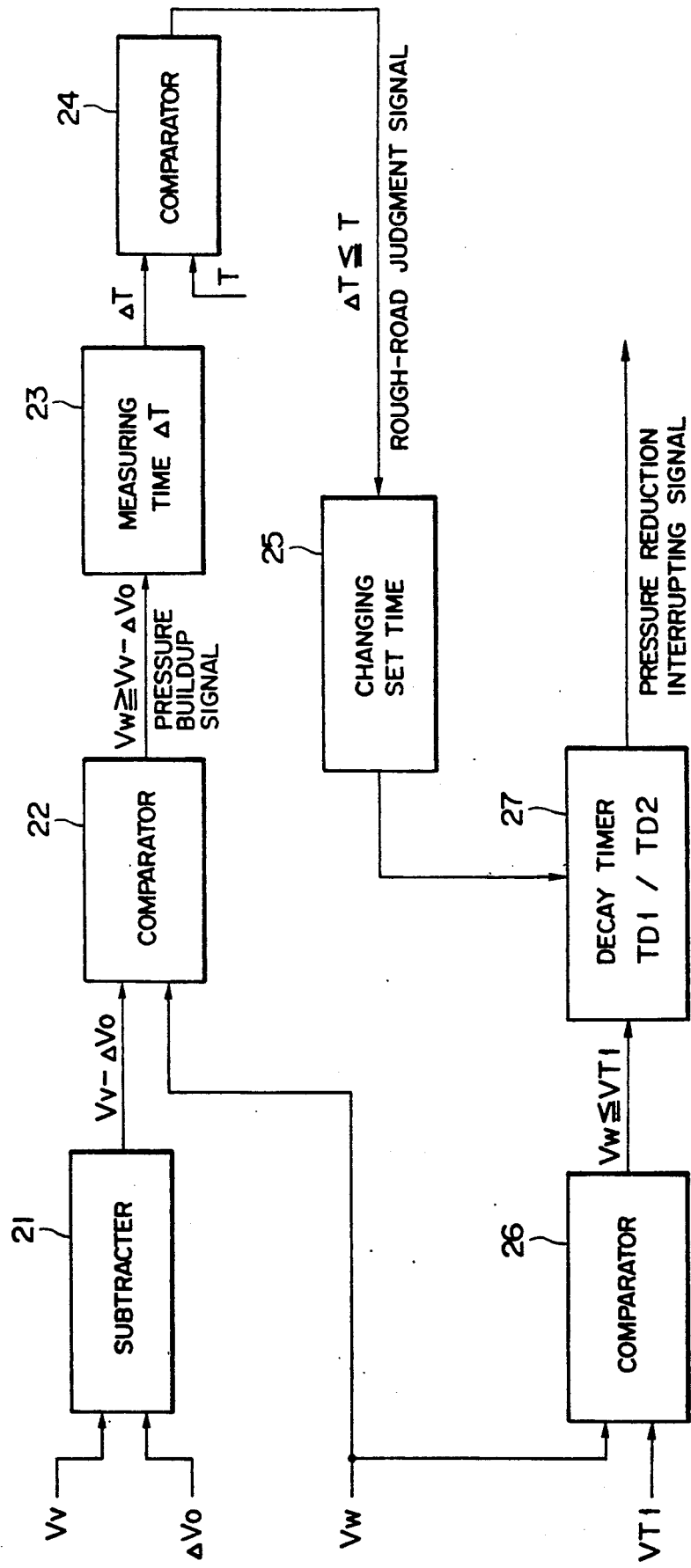
FIG. 4 is a block diagram illustrating the functions of the control portion of the anti-lock control system shown in FIG. 2.

FIG. 4 is a block diagram showing that portion of the function of the control means 17 in FIG. 2 which relates in particular to the present invention.

Computed vehicle speed Vv and a predetermined value $\Delta V_o$ will be passed to subtracting means 21 so that subtraction will be effected therein. The result of the subtraction, i.e., $Vv - \Delta V_o$ and wheel speed Vw will be compared in comparator means 22; the time period $\Delta T$ from a time point when such relationship that $Vv - \Delta V_o \geqq Vw$ occurs, i.e., from the time point H when status 9 occurs in FIG. 3 to a time point when the status 9 occurs again, will be measured in time measuring means 23; and the time period $\Delta T$ thus measured will be passed to comparator means 24. In the comparator means 24, the time period $\Delta T$ will be compared with a predetermined time period T; when $\Delta T \leqq T$, the comparator means 24 will provide a rough-road judgement signal which will in turn be passed to a set-time changeover means 25; and in response to the rough-road judgement signal, the set-time changeover means 25 will provide a set-time changeover signal to decay timer 27.

Meanwhile, the wheel speed Vw and first threshold value VT1 will be compared in comparator means 26; when $Vw \leqq VT1$, i.e., when the wheel speed Vw becomes lower than the first threshold value VT1, the decay timer 27 will be started. In case no rough-road judgement signal is being provided by the comparator means 24, time TD1 will be set on the decay timer 27 by the set-time changeover means 25. In such a case, the decay timer 27 will be set at a time point when the wheel speed Vw becomes lower than the first threshold value VT1, and provides a pressure reduction interrupting signal at a time point when the set time TD1 elapses. In case the pressure reduction at the status 4 is being continued at the time point when the pressure reduction interruption signal is provided, then the pressure reduction will be interrupted.

On the other hand, in case a rough-road judgement signal is provided by the comparator means 24, then time set on the decay timer 27 will be change from TD1 to TD2, which is shorter than TD1, by the set-time changeover means 25. In this case, too, the decay timer 27 will be set at a time point when the wheel speed Vw becomes lower than the first threshold value VT1, and provides a pressure reduction interruption signal at a time point when the set time TD2 elapses. If the pressure reduction at the status 4 is being continued at the time point when the pressure reduction interrupting signal is provided, then the pressure reduction will be interrupted.

Figure 5:
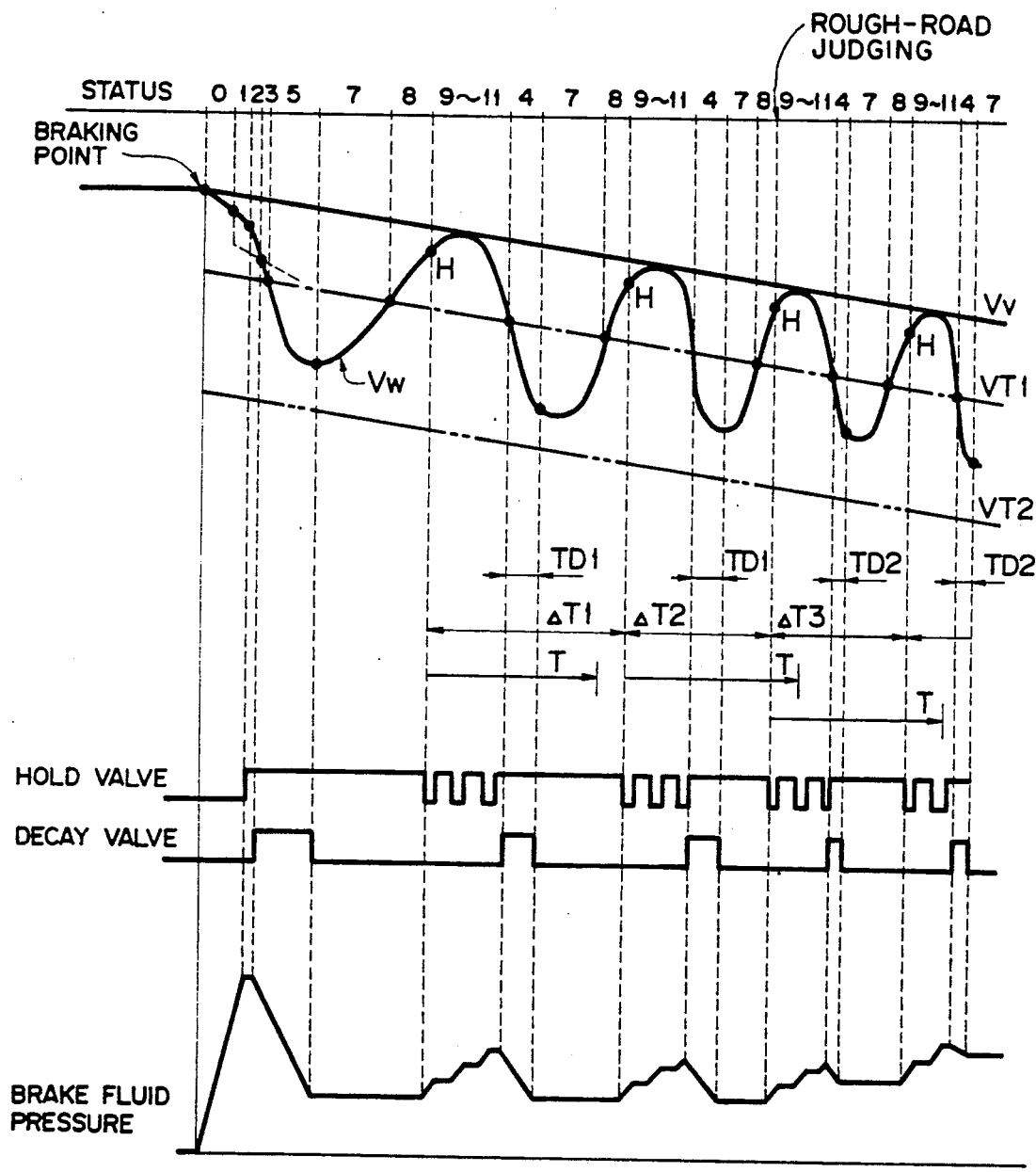
FIG. 5 is a view useful for explaining the rough-road judging operation which is performed in the anti-lock control system of FIG. 2.

FIG. 5 is a timing chart useful for explaining the rough-road coping method which constitutes a characterizing feature of the present invention. In FIG. 5, time periods $\Delta T1$, $\Delta T2$, $\Delta T3$, ... from time point H when pressure buildup is started to subsequent time points H, will be measured by the time measuring means 23 all the time: and if each such time is shorter than predetermined time length T (in FIG. 5, $\Delta T1$ is longer than T while $\Delta T2$ and $\Delta T3$ are shorter than T), then the road on which the vehicle is running, will be judged as a rough road. At status 4 which occurs for the first time after the rough-road judgement is effected, time set on the decay timer 27 will be changed from the time TD1 for normal road to a shorter time TD2, whereby the pressure reduction period will be shortened and thus the reduction of the brake hydraulic pressure will be restricted so that a sufficient braking force will be secured.

Figure 6:
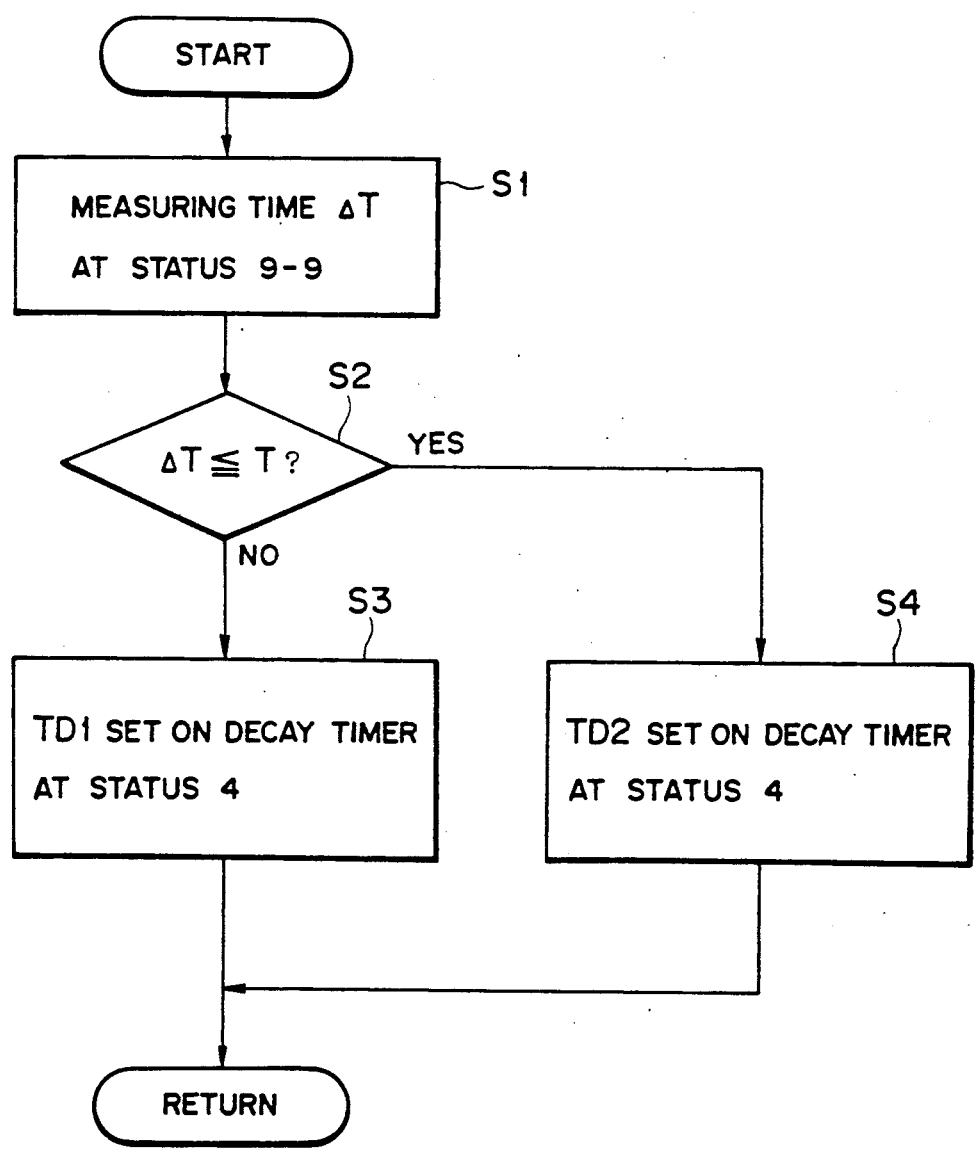
FIG. 6 is a flow chart useful for explaining rough-road coping control routine adopted in the anti-lock control system of FIG. 2.

FIG. 6 is a flow chart relating to the aforementioned rough-road coping routine. At step S1, the time period $\Delta T$ (say $\Delta T1$, $\Delta T2$, $\Delta T3$, ...) from a time point H to a subsequent time point H is measured by the time measuring means 23. At the next step S2, this time period $\Delta T$ and predetermined time period T are compared in the comparator means 24. If the time period $\Delta T$ exceeds the predetermined time length T, the result of the judgement at the step S2 turns out to be "NO" so that at the next step S3, the time set on the decay timer 27 at the status 4 is made to be TD1 at the step S3. On the other hand, if the result of the comparison at the step S2 is such that the time period $\Delta T$ is shorter than the predetermined time length T, it is judged that the road on which the vehicle is running is a rough road, and the time set on the decay timer 27 at the status 4 is made to be TD2 which is shorter than TD1.

While the present invention has been illustrated and described with respect to specific embodiments thereof, it should be understood that the present invention is by no means limited thereto but encompasses all changes and modifications which will become possible within the scope of the appended claims.

I claim:

1. An anti-lock control system for a motor vehicle wherein buildup, holding or reduction of brake hydraulic pressure is effected on the basis of changes in wheel speed as caused during braking operation, thereby preventing wheels of the motor vehicle from being locked, said system comprising:
   rough-road judging means (23, 24) for judging whether the motor vehicle is running on a rough road;
   means for comparing the wheel speed with a first threshold value to determine a brake hydraulic pressure reduction starting point; and
   decay timer means (27) for limiting maximum time period for brake hydraulic pressure reduction within a first predetermined time length while the motor vehicle is running on a normal road, and for limiting, when it is judged by said rough-road judging means that the motor vehicle is running on a rough road, said maximum time period for brake hydraulic pressure reduction within a second predetermined time length shorter than said first predetermined time length in response to said judgement, irrespective of the relationship between said wheel speed and said first threshold value.

2. The anti-lock control system according to claim 1, wherein said rough-road judging means (23, 24) comprises:
   means (23) adapted for measuring control cyclic period $\Delta T$ of the anti-lock control; and
   means (24) adapted for comparing the measured control cyclic period $\Delta T$ with a predetermined time period T, and also adpated for providing a rough-road judgment signal when said control cyclic period $\Delta T$ occurs within said predetermined time period T, for providing a rough-road judgment signal.

3. The anti-lock control system according to claim 2, wherein the control cyclic period $\Delta T$ of the anti-lock control is measured as a time period from any pressure buildup starting time point to next such time point.

4. The anti-lock control system according to claim 1, wherein said system further comprises:

means (13) for calculating a computed vehicle speed Vv approximate to real vehicle speed on the basis of four wheel speeds; and threshold valve calculating means (14) for calculating said first threshold value VT1 and a second threshold value VT2 each following said computed vehicle speed Vv with a predetermined speed difference, where Vv>VT1>VT2;

said decay timer means (27) being adapted to start time measurement from a time point when the wheel speed Vw as decreasing becomes lower than said first threshold value VT1.

5. The anti-lock control system according to claim 4, wherein said computed vehicle speed Vv is a speed achieved by selecting the highest one of four wheel speeds and having its acceleration and deceleration limited within a predetermined range.

6. The anti-lock control system according to claim 5, wherein said predetermined range of acceleration and deceleration is from +1 G to −1 G.

* * * * *